(12) United States Patent
Kowal et al.

(10) Patent No.: US 6,760,422 B1
(45) Date of Patent: Jul. 6, 2004

(54) APPARATUS AND METHOD FOR PROVIDING CONFERENCE CALL SERVICE

(75) Inventors: James A. Kowal, Naperville, IL (US); Bijay K. Roy, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/303,028

(22) Filed: Apr. 30, 1999

(51) Int. Cl.$^7$ ............................................... H04M 3/42
(52) U.S. Cl. .................. 379/202.01; 370/260; 370/261; 370/262; 370/352; 370/353; 379/93.21; 379/204.01; 379/206.01; 709/204
(58) Field of Search ....................... 379/202.01, 203.01, 379/206.01, 700, 93.21, 265.09, 204.01; 370/260, 261, 262, 263, 264, 265, 352, 353; 709/204

(56) References Cited

U.S. PATENT DOCUMENTS

| | | | | |
|---|---|---|---|---|
| 4,475,190 A | * | 10/1984 | Marouf et al. ............... | 370/260 |
| 4,796,293 A | * | 1/1989 | Blinken et al. ......... | 379/202.01 |
| 5,099,510 A | * | 3/1992 | Blinken, Jr. et al. .... | 379/202.01 |
| 5,373,549 A | * | 12/1994 | Bales et al. ............... | 379/93.21 |
| 5,483,588 A | * | 1/1996 | Eaton et al. ........... | 379/202.01 |
| 5,583,869 A | | 12/1996 | Grube et al. | |
| 5,778,187 A | * | 7/1998 | Monteiro et al. ........... | 709/231 |
| 5,790,201 A | * | 8/1998 | Antos ......................... | 348/552 |
| 5,903,637 A | * | 5/1999 | Hogan et al. .......... | 379/203.01 |
| 5,909,431 A | * | 6/1999 | Kuthyar et al. ............. | 370/260 |
| 5,916,302 A | * | 6/1999 | Dunn et al. ................. | 709/204 |
| 5,920,546 A | * | 7/1999 | Hebert et al. ............... | 370/260 |
| 5,978,463 A | * | 11/1999 | Jurkevics et al. ....... | 379/202.01 |
| 6,163,531 A | * | 12/2000 | Kumar ....................... | 370/260 |
| 6,311,231 B1 | * | 10/2001 | Bateman et al. ........ | 379/265.09 |
| 6,574,216 B1 | * | 6/2003 | Farris et al. ................ | 370/352 |

* cited by examiner

*Primary Examiner*—Bing Bui

(57) ABSTRACT

A telephone interface (110) that supports a first and a second conference call service is provided in a telephone-capable apparatus (102). An input device (122) is further provided, allowing a conference call conferee to provide participation status data to a controller (116, 118) of the apparatus. The controller provides a message to a switch (104), responsive to the participation status data, instructing the switch to provide the apparatus with communication resources commensurate with the participation status data. When the participation status data indicates that the conferee is a speaking and listening conferee, the message instructs the switch to provide resources sufficient to support the first conference call service and a send-only version of the second conference call service. When the participation status data indicates that the conferee is a listening-only conferee, the message instructs the switch to provide resources sufficient to support a receive-only version of the second conference call service.

16 Claims, 3 Drawing Sheets

APPARATUS AND METHOD FOR PROVIDING CONFERENCE CALL SERVICE

TECHNICAL FIELD

The present invention relates generally to telecommunications systems and, in particular, to an apparatus and method for providing conference call service based on participation status.

BACKGROUND OF THE INVENTION

Telecommunications systems are well known in the art. For many years, circuit-switched telephone systems have been used to provide a variety of communication services. In a circuit-switched system, generally speaking, end-to-end communication resources are provided in a dedicated fashion in response to each communication request. Thus, when a call is placed in a circuit-switched telephone communication system, those communication resources provided to complete the call (i.e., trunk lines, switch resources, etc.) are used exclusively by the called and calling parties for the duration of the call. Upon completion of the call, the resources are made available for subsequent exclusive assignment to another call.

In contrast, more recently developed telecommunications systems rely on the non-exclusive use of communication resources. For example, in a packet-switched system, individual communication resources are not provided for dedicated use; rather, they are available for simultaneous use by multiple sources and destinations. Examples of widely used packet-switched systems are the so-called Internet and World Wide Web. In these systems, communication resources (e.g., a dedicated phone line coupled to a gateway) used to provide a given computer access to a web page can simultaneously provide other computers access to other web pages.

As the use of packet-switched systems becomes increasingly pervasive, techniques for providing telephone communications via packet-switched systems have been the subject of significant development. Indeed, various systems have emerged providing a variety of services, including conference calling. Documents describing such systems include Recommendation T.120 (07/96) "Data Protocols for Multimedia Conferencing" by ITU-T (International Telecommunication Union—Telecommunication Standardization Sector) and SR-4717, "Voice Over Packet in Next Generation Networks: An Architectural Framework" (Issue 1, Feb. 1999) by Bellcore. Currently, circuit-switched telephone systems generally provide several advantages over packet-switched telephone systems, i.e., higher voice quality, low latency, etc. However, in comparison to circuit-switched telephone systems, packet-switched telephone systems have the potential to provide cheaper communications to a large number of called parties, making packet-switched telephone systems an attractive option for providing conference call services. As packet-switched telephone systems become more widely accepted, it is anticipated that an increasing number of users will use such systems for conference calling. Thus, it would be advantageous to provide a solution that allows telephone users to reap the benefits of both circuit-switched and packet-switched telephone communications, particularly in the area of conference call services.

SUMMARY OF THE INVENTION

The present invention may be more fully described with reference to FIGS. 1–3. FIG. 1 illustrates a telecommunications system 100 comprising an apparatus 102 coupled to a switch 104 that provides connectivity with both a circuit-switched telephone network 106 and a packet-switched telephone network 108. Circuit-switched telephone networks are well-known in the art and need not be described in greater detail here. Furthermore, the circuit-switched telephone network 106 supports conference call services using known techniques, such as conference bridges and related techniques. Preferably, the packet-switched telephone network 108 comprises an Internet Telephony network, as described by Recommendation T.120 (07/96) "Data Protocols for Multimedia Conferencing" by ITU-T (International Telecommunication Union—Telecommunication Standardization Sector) or SR-4717, "Voice Over Packet in Next Generation Networks: An Architectural Framework" (Issue 1, Feb. 1999) by Bellcore. Likewise, the packet-switched telephone network 108 supports conference call services, such as Internet Telephony conference call services as described in the above-mentioned ITU-T and Bellcore documents. Of course, the present invention is not necessarily limited to given circuit-switched or packet-switched conference call services and is only limited by the availability of platforms capable of supporting such services within the apparatus 102 and switch 104. As shown in FIG. 1, both the circuit-switched network 106 and the packet-.switched network 108 support telephone communications with a variety of telephone-capable devices 144–154, which devices may participate in conference calls.

DETAILED DESCRIPTION OF THE PREFERRED EMBODIMENTS

Figure 1:
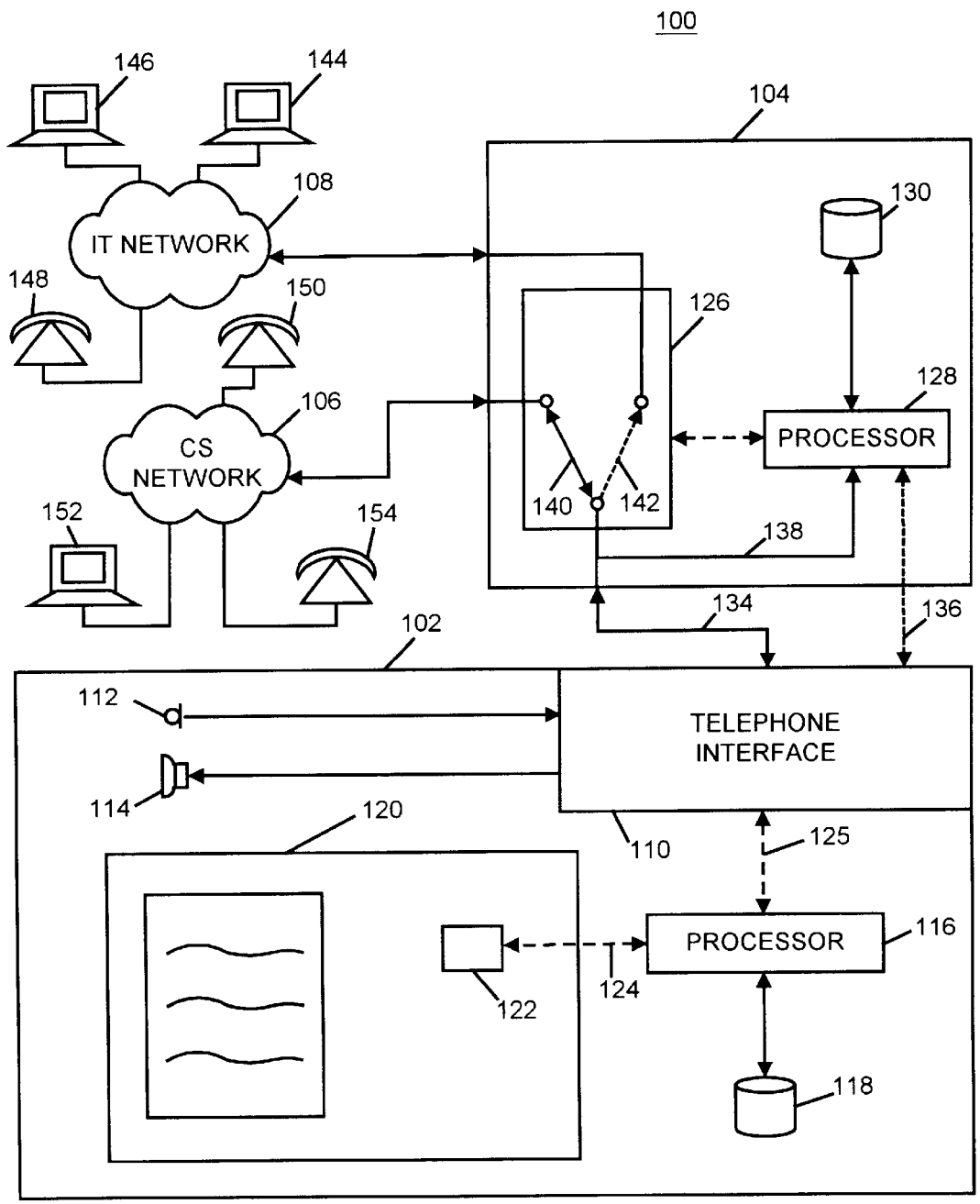
FIG. 1 is a block diagram of a telecommunications system in accordance with the present invention.

The present invention may be more fully described with reference to FIGS. 1–3. FIG. 1 illustrates a telecommunications system 100 comprising an apparatus 102 coupled to a switch 104 that provides connectivity with both a circuit-switched telephone network 106 and a packet-switched telephone network 108. Circuit-switched telephone networks are well-known in the art and need not be described in greater detail here. Furthermore, the circuit-switched telephone network 106 supports conference call services using known techniques, such a conference bridges and related techniques. Preferably, the packet-switched telephone network 108 comprises an Internet Telephony network, as described by Recommendation T.120 (07/96) "Data Protocols for Multimedia so Conferencing" by ITU-T (International Telecommunication Union—Telecommunication Standardization Sector) or SR-4717, "Voice Over Packet in Next Generation Networks: An Architectural Framework" (Issue 1, Feb. 1999) by Bellcore. Likewise, the packet-switched telephone network 108 supports conference call services, such as Internet Telephony conference call services as described in the above-mentioned ITU-T and Bellcore documents. Of course, the present invention is not necessarily limited to given circuit-switched or packet-switched conference call services and is only limited by the availability of platforms capable of supporting such services within the apparatus 102 and switch 104. As shown in FIG. 1, both the circuit-switched network 106 and the packet-switched network 108 support telephone communications with a variety of telephone-capable devices 144–154, which devices may participate in conference calls.

The apparatus 102 may comprise any device capable of supporting telephone services. In the embodiment depicted in FIG. 1, the apparatus 102 is a computer comprising a telephone interface 110 coupled to a microphone 112, speaker 114 and processor 116. The processor 116, in turn, is coupled to a storage device 118 and to a graphical user interface 120, such as a CRT display or similar device. The storage device 118, which may comprise volatile and/or non-volatile digital memory devices as known in the art, is used to store programming instructions that are executed by the processor 116. The processor 116, when executing such stored programming instructions, comprises a controller for the apparatus 102.

The telephone interface 110 provides the necessary functionality to support telephone communications with the switch 104. For example, the telephone interface may comprise an analog telephone interface capable of supporting more than one phone line, or it may comprise an ISDN (Integrated Digital Services Network) telephone interface also capable of supporting multiple phone services. The telephone interface 110 supports a first conference call service having a higher quality of service and a second conference call service having a lower quality of service. For example, the first conference call service may comprise a circuit-switched conference call service and the second conference call service may comprise an Internet Telephony conference call service Quality of service for conference call services can be gauged based on a variety of factors including, but not limited to, voice quality, voice processing delay, link reliability (i.e., the probability of connections between conferees being interrupted or lost), cost, and scalability (i.e., the ability to include larger numbers of conferees in a conference call). It is anticipated that, at least for the foreseeable future, circuit-switched conference call services will provide an overall higher quality of service relative to Internet Telephony conference call services when compared based on these factors. Of course, such determinations are somewhat subjective and technological advances may dictate a reassessment of such a ranking the future. Regardless, in the context of the present invention, it only matters that the first and second conference call services provide differing quality levels of service, which difference in quality may be used to better accommodate the participation status of conference call conferees.

An input device 122, coupled to the controller, is also provided. The input device 122 provides participation status data 124 in response to an operator (conferee) of the apparatus 102. As such, the input device 122 may comprise any of a variety of devices capable of providing such data in response to operator manipulation, e.g., a keyboard, button, dial or similar device. As shown in FIG. 1, the input device 122 comprises an operator-selectable icon presented via the graphical user interface 120. As an icon, the input device 122 can be configured to toggle between various participation states when selected by an operator. Furthermore, the icon can be configured to display information regarding either the current participation status or participation states other than the current one. In one embodiment of the present invention, a conferee may either elect to be a speaking and listening conferee (i.e., to transmit and receive voice information relative to the conference call) or to be a listening-only conferee (i.e., to only receive voice information relative to the conference call). Thus, for example, if the participation status of the conferee is currently that of a speaking and listening conferee, the input device 122 (icon) can be configured to display the current participation state (i.e., "Speaking and Listening"). If the conferee chooses to manipulate the input device 122 (through the use of a mouse and pointer arrangement, or a touch-screen arrangement) in order to change participation status to that of a listening-only conferee, the icon is rendered to reflect the new participation state (i.e., "Listening-Only"). Alternatively, the icon can be configured to display the available participation state, that is, the one other than the current state. Thus, while in the speaking and listening participation state, the icon can display "Select For Listening-Only". Conversely, when in the listening-only state, the icon can display "Select For Speaking and Listening". Of course, those having ordinary skill in the art will have little difficulty devising a variety of similar methods based on such an iconic input device, and the present invention is not limited in this regard.

Regardless of the method used to implement the input device 122, participation status data 124 is provided to the controller each time the input device is operated by the conferee. Responsive to the participation status data 124, the controller generates a message 125 to be sent to the switch 104 via the telephone interface 110. The message 125 may or may not include the participation status data 124, and is preferably formatted as a control message suitable for transmission to the switch 104. Regardless of its form, the message 125 instructs the switch to provide the apparatus 102 with sufficient resources to support the selected participation state as determined by the participation status data 124, discussed in greater detail below.

The switch 104, such as a "5ESS" switch by Lucent Technologies, comprises a switching fabric 126, processor 128 and memory 130. For the purposes of the present invention, the processor 128 provides control of operations of the switch based on programming instructions stored in the memory 130. (The makeup and operation of such switches is well known in the art and need not be discussed in greater detail here.) In particular, the processor 128 controls the switching fabric 126 in order to provide connectivity between networks and calling or called endpoints (e.g., the apparatus 102 and telephone-capable devices 144–154). In the context of the present invention, the switch receives messages from endpoint such as the apparatus 102 requesting changes to resources provided to the endpoint in support of conference call service. Such messages can be provided to the switch 104 in various ways. For example, if in-band messaging is used, such messages would be sent to the switch 104 via a voice link 134 from the apparatus 102. A link 138 is shown between the voice link 134 and the processor 128 to indicate that such in-band messaging is received by the processor 128 for processing. As an alternative, or in addition, to in-band messaging, out of band messaging may also be used, as represented by the control link having reference numeral 136. In this case, control messages between the switch 104 and the apparatus are exchanged via a dedicated control link 136 separate from the voice traffic. Operation of the switch 104 and the apparatus 102 is described in further detail with regard to FIGS. 2 and 3.

Figure 2:
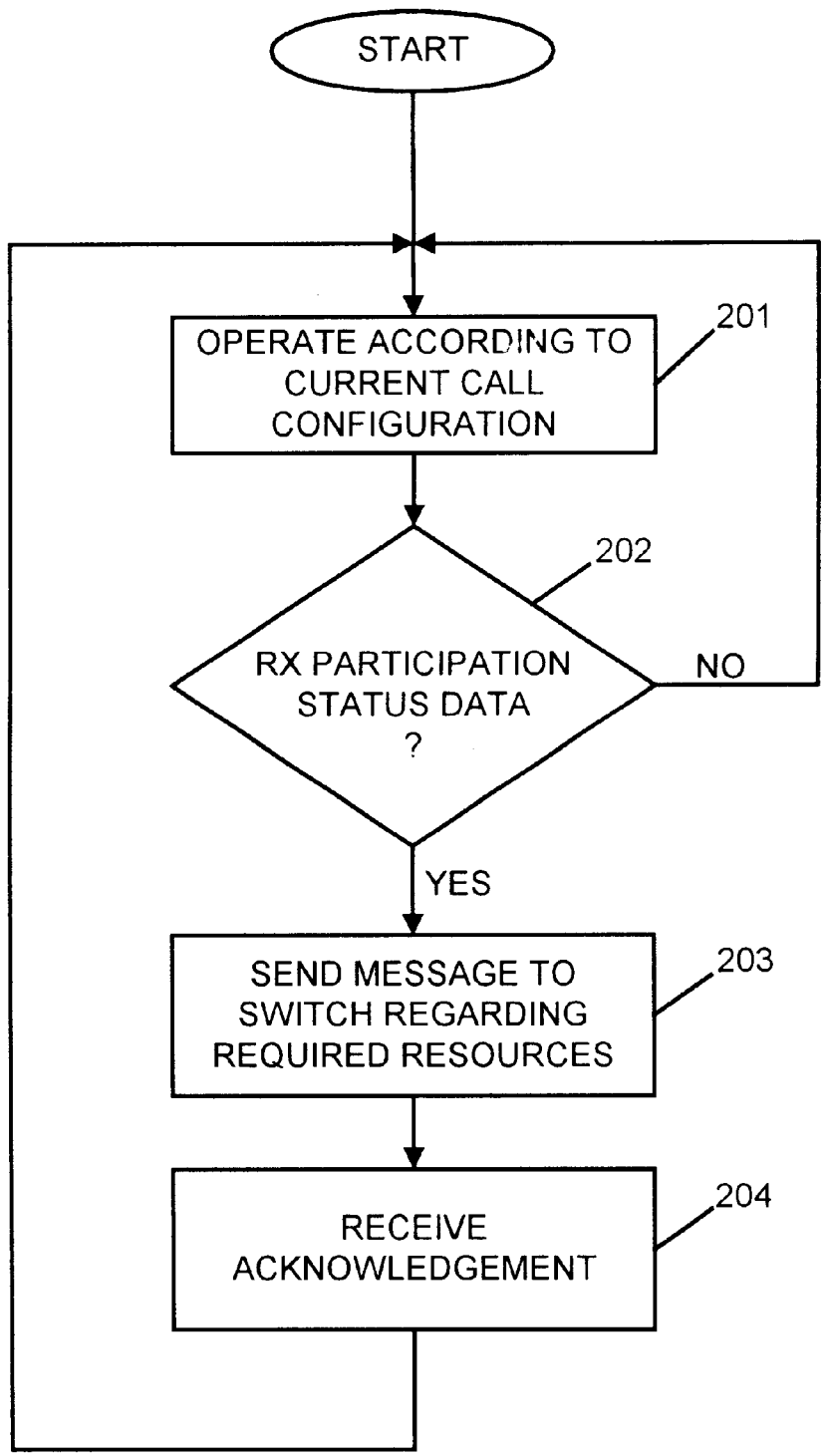
FIG. 2 is a flowchart illustrating a method for a conferee in a conference call to modify conference call services based on participation status in accordance with the present invention.

FIG. 2 illustrates a method in support of a conference call allowing a conferee greater control of the conference call service being provided. The steps illustrated in FIG. 2 are carried out at the endpoint (e.g., apparatus 102) operated by the conferee, preferably in the form of stored programming instructions executed by a processor, as known in the art. For the purposes of description, it is assumed that the apparatus, capable of supporting either or both of a first and second conference call service as described above, is already engaged in a conference call. Preferably, participation in the conference call is initially supported using a listening-only version of the second conference call service, although this need not be the case. At step 201, the endpoint operates according to a current call configuration, i.e., as a listening-only conferee receiving voice information in accordance with the second conference call service.

At step 202, it is determined whether the apparatus has received participation status data, as described above. In the example illustrated in FIG. 1, this would be accomplished by the conferee manipulating the iconic input device 122, thereby indicating a desire to change participation status. Where the apparatus is currently operating in the listening-only state, the participation status data received at step 202 would indicate that the conferee wants to change status to become a speaking and listening conferee. Conversely, where the apparatus is currently operating in the speaking and listening state, the participation status data received at step 202 would indicate that the conferee wants to change status to become a listening-only conferee. The former scenario is presently assumed for purposes of illustration.

Upon receiving the participation status data, the apparatus formulates and sends a message to the switch at step 203. The message can include the participation status data received at step 202, but it is not required. The message instructs the switch to provide resources commensurate with the desired participation status. In the context of the present invention, when a conferee wishes to adopt a status as a speaking and listening conferee, the message indicates that the apparatus should be provided with resources sufficient to support duplex functionality of the first, higher quality, conference call service and resources sufficient to support a send-only version of the second, lower quality, conference call service. Such a call configuration is illustrated in FIG. 1 where the switching fabric 126 is shown providing a duplex path 140 to the circuit-switched network 106 supporting the conference call and a send-only path 142 to the Internet Telephony network 108 also supporting the conference call. If, on the other hand, the message requested resources sufficient to support a receive-only version of the second conference call service in response to participation status data indicating a desire to change to a listening-only participation state, the switch fabric 126 would provide a receive-only path (not shown) between the Internet Telephony network 108 and the voice link 134 supporting the apparatus 102. Regardless, after the switch has performed the necessary operations to fulfill the instructions in the message, the apparatus receives an acknowledgment at step 204 from the switch. After receiving the acknowledgment, the apparatus begins operation in the new call configuration. Continuing with the current example, this would allow the conferee to provide voice information to the conference call (i.e., to speak), which information would be provided to other conferees via both the first conference call service (the circuit-switched service) and the second conference call service (the Internet Telephony service). However, voice information sent to the conferee operating the apparatus would be provided only via the first conference call service.

Although the previous discussion assumed an ongoing conference call, the same principles apply to a newly initiated conference call. That is, at least one conferee to a conference call must initially adopt a speaking and listening participation status, with the remaining conferees having the freedom to do likewise or to initially participate as listening-only conferees. The resources required for either initial participation state chosen by a given conferee are provided in a similar manner, i.e., duplex first conference call service/send-only second conference call service or receive-only second conference call service.

Figure 3:
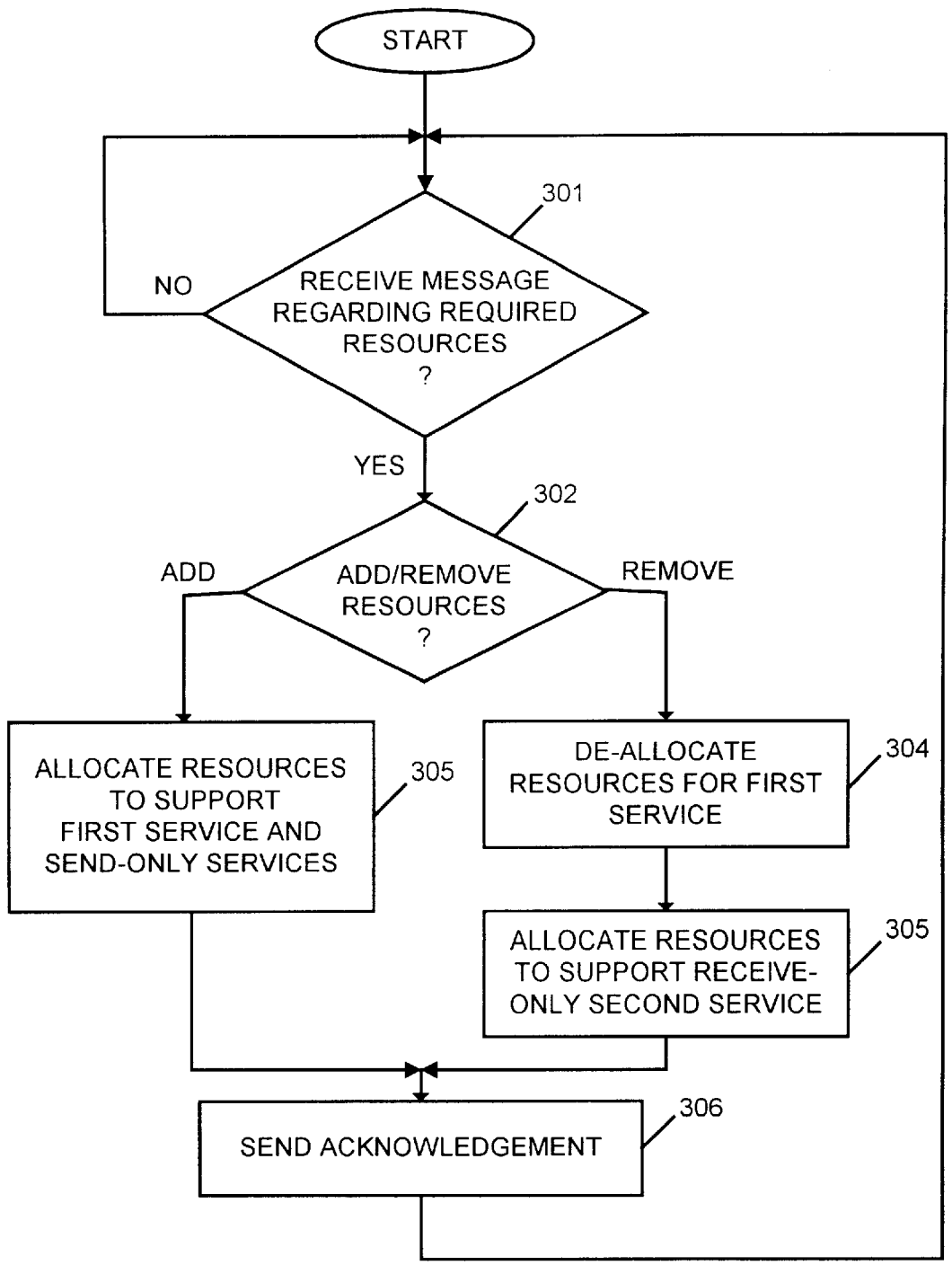
FIG. 3, is a flowchart illustrating a method for a switch to provide a resources for conference call services in accordance with the present invention.

FIG. 3 illustrates a method whereby a switch can support the above-described operations, preferably through the execution of stored programming instructions residing at the switch. At step 301, the switch continuously awaits receipt, from any endpoint with which it has a connection, of a message regarding resources required to support an ongoing conference call. After receipt of a message requesting a change in resources used to support a conference call for a given endpoint, the switch, at step 302 determines whether resources need to be added to support the conference call for the endpoint, or if they can be reduced to support the conference call. In practice, the message may include participation status data relative to a given conference call (as identified, for example, by a process identification number in the switch) such that the switch can interpret the participation status data directly and ascertain the required communication resources. Alternatively, the message may comprise an instruction, without the participation status data, that directly instructs the switch as to the required resources. For example, if the endpoint is currently engaged in the conference call as a listening-only conferee, the switch will currently only be providing the endpoint with receive-only resources for the second conference call service. Thus, if the endpoint indicates (via the message) that its status is to be changed to a speaking and listening conferee, the switch can ascertain that additional resources are required in one of two ways. First, the message could simply instruct the switch to add resources in order to support speaking and listening status; in this manner the switch does not "know" of the change in status, but is simply instructed what to do. Alternatively, the switch could keep track of each conferee's participation status and, when a message comprising new participation status data is received, ascertain from the change in participation status whether resources need to be added or removed for that particular conferee. Those having ordinary skill in the art will recognize that other implementations are possible.

If resources are to be added, as would be the case where the conferee changes status from a listening-only conferee to a speaking and listening conferee, the switch allocates resources to support duplex operation of the first conference call service and send-only operation of the second conference call service at step 303. In contrast, if resources can be removed due to the status change, as would be the case where the conferee changes status from a speaking and listening conferee to a listening-only conferee, the switch first deallocates resources from the first conference call service (i.e., makes the resource available for assignment in support of other services) at step 304, and allocates resources to support receive-only operation of the second conference call service at step 305. Techniques for the allocation and deallocation of communication resources by a switch are well known in the art. Once the appropriate changes to resource allocation have been made, the switch sends an acknowledgment to the endpoint via an appropriate control link at step 306. Once the acknowledgment has been sent, the endpoint is free to use the newly allocated resources in the appropriate manner as dictated by that endpoint's new participation status.

Once again, although the previous discussion assumed an ongoing conference call, operation of the switch is essentially the same as applied to a newly initiated conference call. That is, at least one conferee to a conference call must initially adopt a speaking and listening participation status, with the remaining conferees having the freedom to do likewise or to initially participate as listening-only conferees. The resources required for either initial participation state chosen by a given conferee are provided by the switch in a similar manner, i.e.,duplex first conference call service/ send-only second conference call service or receive-only second conference call service.

What has been described is merely illustrative of the application of the principles of the present invention. Other arrangements and methods can be implemented by those skilled in the art without departing from the spirit and scope of the present invention.

What is claimed is:

1. An apparatus for providing conference call service, the apparatus comprising:
   a telephone interface adapted to support communications with a switch and adapted to support a first conference call service and a second conference call service;
   an input device adapted to provide participation status data in response to an operator of the apparatus, wherein the operator of the apparatus may elect to be any one of, and contemporaneously with at least part of the first and second conference call services may elect one or more times to change between being:
      a speaking and listening conferee; and
      a listening-only conferee; and
   a controller, coupled to the input device and the telephone interface, adapted to send a message to the switch responsive to the participation status data;
   wherein the first conference call service has a higher quality of service and the second conference call service has a lower quality of service;
   wherein the message instructs the switch to provide the apparatus with communication resources through the first conference call service when the operator elects to be the speaking and listening conferee, wherein the message instructs the switch to provide the apparatus with communication resources through the second conference call service when the operator elects to be the listening-only conferee.

2. The apparatus of claim 1, wherein the first conference call service has a higher quality of service and the second conference call service has a lower quality of service.

3. The apparatus of claim 1, wherein the first conference call service is a circuit-switched conference call service.

4. The apparatus of claim 1, wherein the second conference call service is an Internet Telephony conference call service.

5. The apparatus of claim 1, wherein the participation status data comprises an indication of status as a speaking and listening conferee.

6. The apparatus of claim 1, wherein the controller is adapted to send another message to the switch responsive to the participation status data when the participation status data comprises an indication of status as a listening-only conferee, wherein the message instructs the switch to provide the apparatus with communication resources sufficient to support a receive-only version of the second conference call service.

7. A stored program controlled computer capable of providing conference call service, the stored program controlled computer comprising:
   a telephone interface adapted to support communications with a switch and adapted to support a first conference call service and a second conference call service;
   a graphical user interface capable of displaying an operator-selectable icon, the operator-selectable icon being adapted to provide participation status data in response to an operator of the computer, wherein the operator of the computer may elect to be any one of, and contemporaneously with at least part of the first and second conference call services may elect one or more times to change between being:
      a speaking and listening conferee; and
      a listening-only conferee; and
   a controller, coupled to the operator-selectable icon and the telephone interface, adapted to send a message to the switch responsive to the participation status data,
   wherein the first conference call service has a higher quality of service and the second conference call service has a lower quality of service;
   wherein the message instructs the switch to provide the apparatus with communication resources through the first conference call service when the operator elects to be the speaking and listening conferee, wherein the message instructs the switch to provide the apparatus with communication resources through the second conference call service when the operator elects to be the listening-only conferee.

8. The computer of claim 7, wherein the first conference call service is a circuit-switched conference call service.

9. The computer of claim 7, wherein the second conference call service is an Internet Telephony conference call service.

10. The computer of claim 7, wherein the participation status data comprises an indication of status as a speaking and listening conferee.

11. The computer of claim 7, wherein the controller is adapted to send another message to the switch responsive to the participation status data when the participation status data comprises an indication of status as a listening-only conferee, wherein the message instructs the switch to provide the apparatus with communication resources sufficient to support a receive-only version of the second conference call service.

12. A method for a telephone-capable apparatus, coupled to a switch and operated by a conferee in a conference call, to provide conference call service, the method comprising steps of:
   receiving participation status data provided by the conferee, wherein the conferee in the conference call may elect to be any one of, and contemporaneously with at least part of first and second conference call services may elect one or more times to change between being:
      a speaking and listening conferee; and
      a listening-only conferee;
   wherein the first conference call service has a higher quality of service and the second conference call service has a lower quality of service; and
   sending to the switch a message, responsive to the participation status data, instructing the switch to provide the telephone-capable apparatus with communication resources through the first conference call service when the operator elects to be the speaking and listening conferee, wherein the message instructs the switch to provide the apparatus with communication resources through the second conference call service when the operator elects to be the listening-only conferee, wherein the telephone-capable device supports the first and second conference call services.

13. The method of claim 12, wherein the first conference call service is a circuit-switched conference call service.

14. The method of claim 12, wherein the second conference call service is an Internet Telephony conference call service.

15. The method of claim 12, wherein the participation status data indicates that the conferee is a speaking and listening conferee.

16. The method of claim 12, further comprising a step of:

sending another message to the switch responsive to the participation status data when the participation status data indicates that the conferee is a listening-only conferee, wherein the message instructs the switch to provide the telephone-capable apparatus with communication resources sufficient to support a receive-only version of the second conference call service.

* * * * *